E. SCHOLLE.
PINCH BAR.
APPLICATION FILED JUNE 6, 1914.
1,109,365.
Patented Sept. 1, 1914.
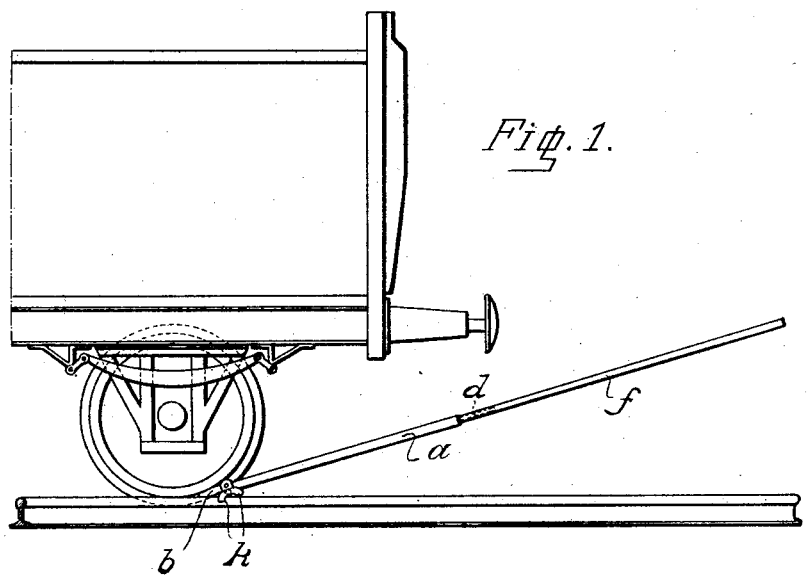
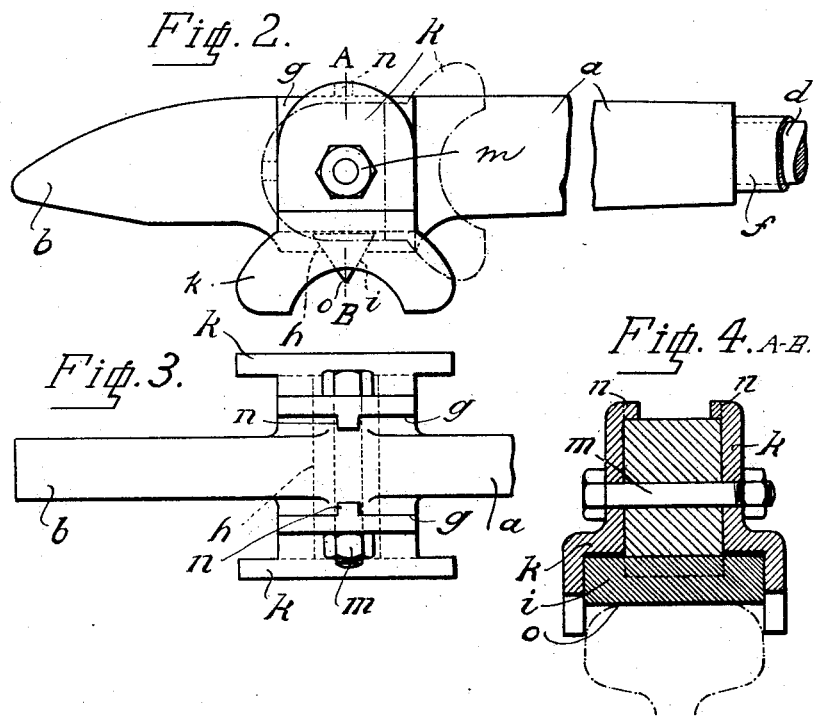

UNITED STATES PATENT OFFICE.

EDUARD SCHOLLE, OF NEUSS-ON-THE-RHINE, GERMANY, ASSIGNOR TO THE FIRM OF WECKS & CO., PROPRIETORS MESSRS. GRAF, KELLER & JOST, OF OBERHAUSEN, RHINELAND, GERMANY.

PINCH-BAR.

1,109,365.      Specification of Letters Patent.      Patented Sept. 1, 1914.

Application filed June 6, 1914. Serial No. 843,356.

*To all whom it may concern:*

Be it known that I, EDUARD SCHOLLE, engineer, a subject of the German Emperor, and residing at 104 Sternstrasse, Neuss-on-the-Rhine, Germany, have invented certain new and useful Improvements in Pinch-Bars, of which the following is a statement.

The present invention relates to an arrangement for moving wagons running on rails.

The new arrangement differs from other known devices of this kind in that it does not comprise any movable parts, which might bend or get slack in working in consequence of the heavy strain.

The present invention is exemplified in the accompanying drawing.

Figure 1 is a view showing the pinch bar in use. Fig. 2 is an enlarged view of its operative end. Fig. 3 is a top view of its end and Fig. 4 is a section on the line A—B in Fig. 2.

The strong bar $a$, made of steel, has at one end a broad point $b$ and at the other end a stud $d$, on which a long piece of tube $f$ is fitted. Close next to the point $b$ two flat bosses $g$ are forged, and a dovetail groove $h$ is cut into the underside of the bar between these bosses $g$. Into this groove is driven with a tight fit a triangular wedge $i$. This wedge $i$ is prevented from leaving its groove by two plates of a peculiar curved shape $k$, which are fitted flat against the bosses $g$ and are held tightly pressed against the latter by means of a screw bolt $m$. At their upper ends these plates $k$ have inwardly turned noses $n$, which engage over the edge of the bosses $g$ and thereby prevent the plates $k$ from turning.

The pinch bar is placed with the edge of the wedge $i$ on the top of the rail, and the point $b$ is inserted between the wheel of the wagon and the rail. Then this point is raised by the tube $f$ being pressed downward, so that the wheel is forced forward. The sharp edge of the wedge prevents the pinch bar from gliding along the rail.

When the pinch bar is to be used for wagons running on grooved rails, or on rails embedded in the pavement, the screw bolt $m$ is loosened, the one plate $k$ is turned around a right angle, so that it assumes the position indicated by the dot-and-dash lines in Fig. 2, and the screw $m$ is tightened again. Also in this position the plate $k$ is held by the nose $n$ engaging over the edge of the boss $g$, and the other plate is inserted into the groove of the rail, or into the groove intended for receiving the wheel flange. The operation of the pinch bar is then the same as hereinbefore described.

The pinch bar forming the subject of the present invention may, thus, also be used with any type of rail and with switches, and its slipping on the rail during the operation is reliably prevented.

I claim:

A pinch bar consisting of a bar tapered flat at one end and having at its other end a long tube fitted to it, in the underside of said bar a dovetail groove, in said dovetail groove a long prismatic wedge, two plates held against bosses at the sides of said bar by a screw bolt and adapted to hold said wedge in position.

In testimony whereof I have hereto affixed my signature in the presence of two subscribing witnesses.

EDUARD SCHOLLE.

Witnesses:
    LOUIS VANDORY,
    GUSTAV PROCKSCHMIDT.

---

Copies of this patent may be obtained for five cents each, by addressing the "Commissioner of Patents, Washington, D. C."